United States Patent [19]
Iwaksaki

[11] Patent Number: 4,839,795
[45] Date of Patent: Jun. 13, 1989

[54] INTERFACE CIRCUIT FOR SINGLE-CHIP MICROPROCESSOR

[75] Inventor: Masahiko Iwaksaki, Aichi, Japan

[73] Assignee: Mitsubishi Denki Kabushiki Kaishi, Tokyo, Japan

[21] Appl. No.: 125,151

[22] Filed: Nov. 25, 1987

[30] Foreign Application Priority Data

Nov. 26, 1986 [JP] Japan .................. 61-281504

[51] Int. Cl.⁴ .............................................. G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,766,526 | 10/1973 | Buchanan | 364/200 |
| 3,806,878 | 4/1974 | Edstrom | 364/200 |
| 3,833,930 | 9/1974 | Macker | 364/200 |
| 4,442,504 | 4/1984 | Dummerermuth et al. | 364/900 |
| 4,514,805 | 4/1985 | McDonough | 364/200 |
| 4,628,158 | 12/1986 | Rubin | 364/200 |

FOREIGN PATENT DOCUMENTS

59-71557  4/1984  Japan .
59-216263 12/1984 Japan .

OTHER PUBLICATIONS

"MCS—96 Hardware Design Information", Chpt. 12 and 14, Intel; pp. 12-1 to 12-57 and 14-1 to 14-39.

Primary Examiner—Gary V. Harkcom
Assistant Examiner—P. H. Lynt
Attorney, Agent, or Firm—Bernard, Rothwell & Brown

[57] ABSTRACT

An interface circuit, having a single-chip microprocessor with program instructions in internal memory, includes switching devices between A-D (Analog to Digital) ports of the microprocessor and ports of the interface circuit for selectively connecting and disconnecting the microprocessor and interface ports. The interface circuit includes a connector through which address latch units and external memory having program instructions can be connected to the single-chip microprocessor. The connector provides for switch over of operation of the microprocessor from internal memory to external memory, and for operation of the switching devices. The connector provides for connection of an I/O (Input/Output) unit to provide input and output to ports of the interface circuit.

4 Claims, 5 Drawing Sheets

INTERFACE CIRCUIT FOR SINGLE-CHIP MICROPROCESSOR

BACKGROUND OF THE INVENTION

1. Field of the Invention

This invention relates to an interface circuit for a single-chip microprocessor which can be utilized in either a first configuration employing internal memory of the singlechip microprocessor or a second configuration employing memory external to the single-chip microprocessor.

2. Description of the Prior Art

Prior art circuits for single-chip microprocessors are shown in FIGS. 1 and 2.

The first circuit configuration shown in FIG. 1 includes a single-chip microprocessor 1, such as model no. 8396 from Intel, having internal RAM, internal ROM with computer programs stored therein, internal timer circuitry, internal I/O ports, and other internal elements so that external elements of the same type are not necessary. Due to the elimination for the requirement of external elements, each of the ports $P_0$ to $P_2$ of the this microprocessor can be utilized as input or output ports, and the most efficient configuration can be obtained for utilization of space for the microprocessor system.

The circuit configuration shown in FIG. 2 employs memory elements which are external to the single-chip microprocessor 1. Data latch units 6 and 7 have data inputs connected to respective first and second address-data (A-D) ports of the microprocessor 1, and have trigger inputs T connected to the ALE (Address Latch Enable) output of the microprocessor 1. External memory elements, such as ROMs 8 and 9 having programs stored therein, have address inputs A connected to outputs of the latch units 6 and 7, have chip select inputs CS connected to outputs of the latch unit 6, have data outputs D connected to the A-D ports of the microprocessor 1, and have operate enable (OE) inputs connected to the read (RD) output of the microprocessor 1. Input-output unit (I/O) 10 has address inputs A connected to the outputs of latches 6 and 7, has chip select input CS connected to the outputs of the latch unit 6, has data port D connected to the second A-D port of the microprocessor 1, has input RD connected to the output RD of microprocessor 1, has write input WR connected to the output WR of the microprocessor 1, and has input and output ports $P_1'$ and $P_2'$.

In the single-chip microprocessor system of FIG. 2, address signals and data signals are multiplexed on the A-D ports, i.e. address signals and data signals are alternately applied to the bus connected to the A-D ports in order to improve efficiency in the utilization of the pins of the single-chip microprocessor 1. In this operation, the address signal outputted from the processor is stored in the latch units 6 and 7 by the ALE signal from the microprocessor 1, the stored address signals designate an address in the ROMs 8 and 9 or I/O unit 10, and then during the next cycle period of the microprocessor 1 a program instruction or data is inputted from ROMs 8 and 9 or inputted from or outputted to I/O unit 10.

The conventional microcomputer systems of the types illustrated by FIGS. 1 and 2 have several disadvantages. In the case of FIG. 1 wherein the single-chip microprocessor employs an internal mask ROM, modification of the program in the internal ROM is not possible. Although the ROM in the case of FIG. 2 can be changed to change the program, the interface circuitry of FIG. 2 cannot be used in a configuration where internal memory is used instead of external memory; the circuit then requires the use of the external elements for I/O functions, and each of the ports of the processor is used only for an address or for the input and output of data.

SUMMARY OF THE INVENTION

An object of the invention is to construct an interface circuit which overcomes the above-mentioned problems.

Another object of the invention is to provide an interface circuit for a single-chip microprocessor having internal mask ROM wherein the interface circuit can be formed on a printed circuit board with the microprocessor and used efficiently with either the internal ROM of the microprocessor or with a system employing external programmable ROM.

The interface circuit for a single-chip microprocessor of the present invention is constructed with a switch circuit connected to an address-data port of the microprocessor for selectively passing port signals or blocking the passage of port signals. When the microprocessor employs internal memory, the switch circuit passes the port signals to input and output ports of the interface circuit, and when the microprocessor employs external memory, the switch circuit blocks passage of the multiplexed address and data signals.

In another feature of the configuration where external memory is employed, connectors provide for connection of the external memory and switch over of the microprocessor to external memory operation.

In still another feature of the second configuration, an I/O unit is connected between the A-D microprocessor ports and the interface input/output ports to provide normal input and output.

Other objects and features of the present invention will be apparent from the following description of the preferred embodiments and the accompanying drawings.

DESCRIPTION OF THE PREFERRED EMBODIMENTS

Figure 1:
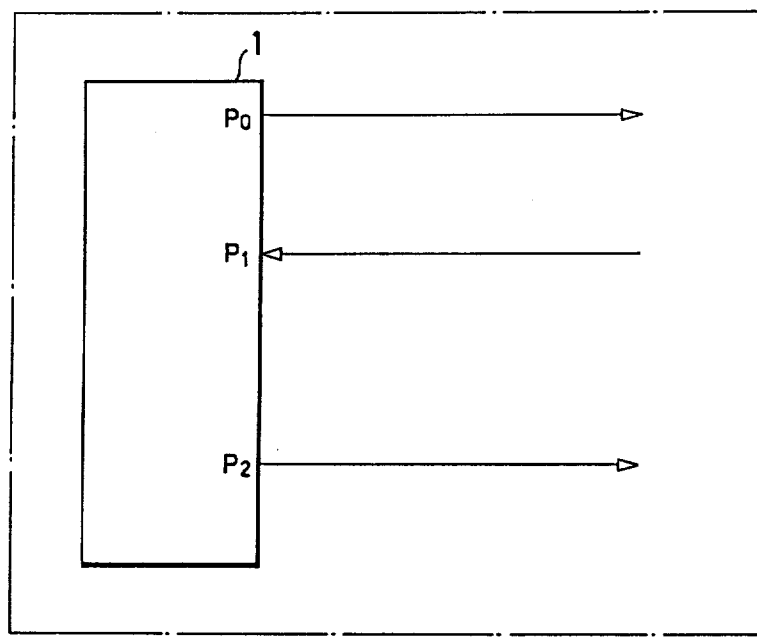
FIG. 1 is a schematic drawing of a conventional microprocessor circuit employing a single-chip microprocessor utilizing internal memory.
Figure 2:
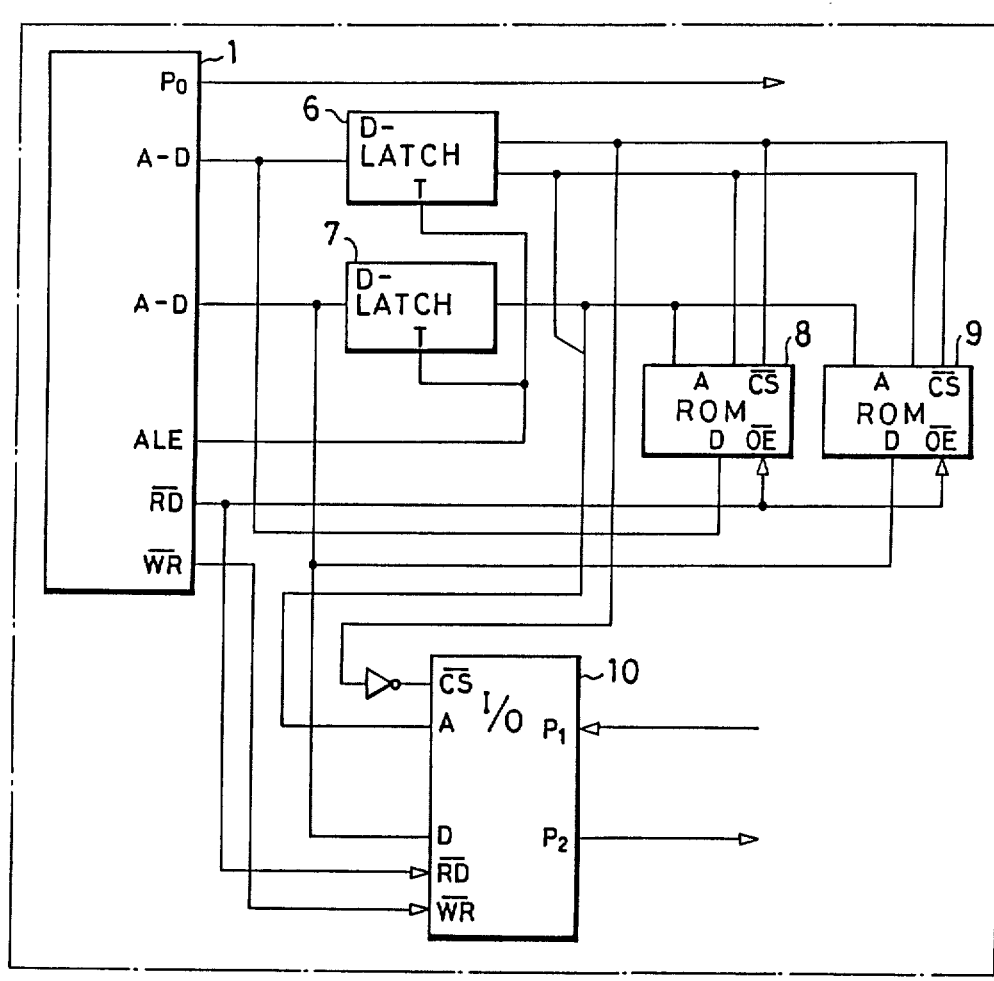
FIG. 2 is a schematic drawing of a conventional microprocessor circuit employing a single-chip microprocessor utilizing external memory.
Figure 3:
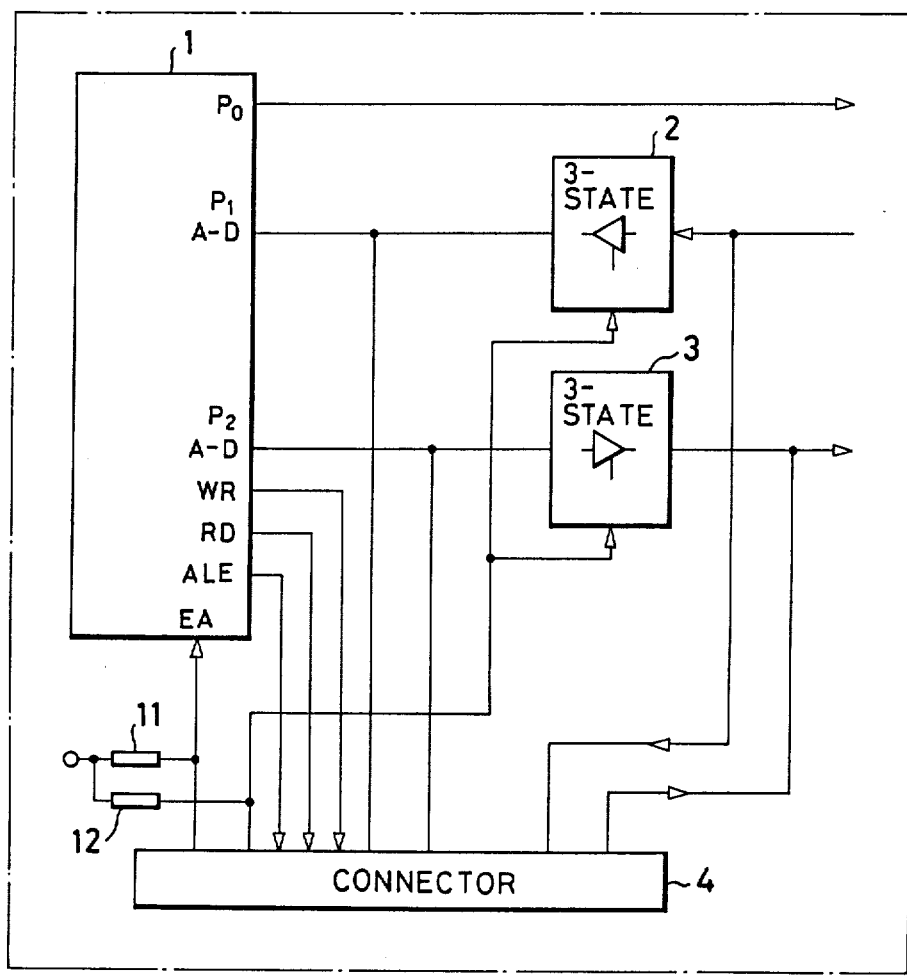
FIG. 3 is a schematic drawing of an interface circuit constructed in accordance with one preferred embodiment of the present invention.

As shown in FIG. 3, one preferred embodiment of the invention includes a single-chip microprocessor 1, which may be of type 8396, having internal mask ROM containing desired programs stored therein. The microprocessor 1 also includes internal RAM, a counter, and an I/O port. Switchable threestate buffers 2 and 3 are connected between respective A-D ports $P_1$ and $P_2$ of the microprocessor 1 and input and output ports of the interface circuit. The buffers 2 and 3 have an "ON" state for passing logical signals "0" and "1", and have an "OFF" state wherein the inputs and outputs of the buffers are high impedance to block or prevent passage of signals between the microprocessor ports and the interface circuit input and output ports. The direction of the buffers 2 and 3 is predetermined in accordance with the interface circuit input and output ports. A resistor 11 biases the EA input of the microprocessor 1 for a mode utilizing internal memory. The switching state of the buffers is controlled by an enable signal, normally biased through resistor 12 into a conductive or "ON" state. A connector 4 is provided for connecting to the circuit of FIG. 4 when the circuit of FIG. 4 is employed.

Figure 4:
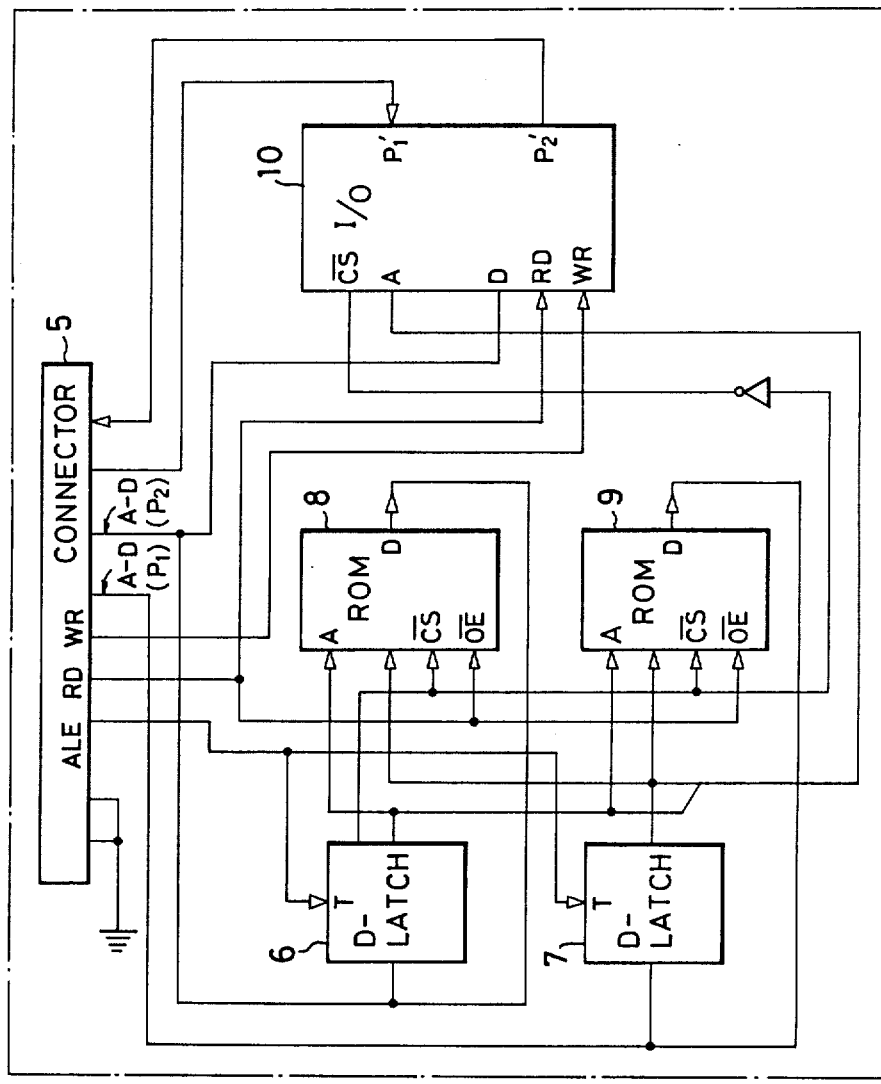
FIG. 4 is a schematic drawing of a circuit portion to be connected to the circuit of FIG. 3 when external memory is utilized.

The circuit of FIG. 4 includes a connector 5 for mating with the connector 4 of FIG. 3. Latch units 6 and 7 have data inputs for connection via the connectors 4 and 5 to the respective A-D ports $P_1$ and $P_2$ of the microprocessor 1, and have trigger inputs T for connection via the connectors 4 and 5 to the ALE output of the microprocessor to receive and store the address during the address cycle of the A-D ports. ROM units 8 and 9, with program instructions stored therein, have address inputs connected to outputs of the latches 6 and 7, have chip select inputs CS connected to outputs of the latch 6, have operation enable inputs OE for connection via the connectors 4 and 5 to the read output RD of the microprocessor 1, and have data outputs D for connection via the connectors 4 and 5 to the A-D ports $P_1$ and $P_2$ of the microprocessor. I/O unit 10 has its data port D connected to the A-D line $P_2$ from connector 5, has its read and write inputs RD and WR connectable to the respective RD and WR outputs of the microprocessor via the connectors 4 and 5, and has input and output ports $P_1'$ and $P_2'$ connectable via the connectors 4 and 5 to the respective input and output ports of the interface circuit of FIG. 3. Ground connections are provided on the connector 5 for grounding the control lines to the three-state buffers 2 and 3 and the EA input of the microprocessor 1 when the connector 5 is connected to connector 4. Grounding of the EA input to the microprocessor 1 causes the microprocessor to operate in a mode utilizing external memory, while grounding of the control inputs of the three-state buffers 2 and 3 renders the buffers in their "OFF" state.

In operation of the circuit of FIG. 3 with the connector 5 disconnected from connector 4, a specified potential applied by the resistor 11 to the EA input of the microprocessor 1 causes the microprocessor to utilize its internal mask ROM for program instructions. A similar potential is applied through resistor 12 to the control inputs of three-state buffers 2 and 3 to render these buffers in their "ON" or conductive state. The microprocessor 1 then operates in accordance with the program in its internal mask ROM and all of the ports $P_0$, $P_1$, and $P_2$, operate as input/output ports of the interface circuit.

In operation of the circuits of FIGS. 3 and 4 with the connectors 4 and 5 connected together, the program memory selection input EA of the microprocessor 1 is grounded to cause the microprocessor to utilize external memory via A-D ports $P_1$ and $P_2$. Addresses from the A-D ports $P_1$ and $P_2$ are stored by the ALE signal in the latches 6 and 7 which apply these address signals to the ROMs 8 and 9 and the I/O unit 10. During a subsequent read cycle, a program instruction or data is passed from ROMs 8 and 9 back to the A-D ports $P_1$ and $P_2$, or data read from an interface input port by the I/O unit 10 is passed from I/O unit 10 to A-D port $P_2$. If output of data from an interface output port through I/O unit 10 is made, the microprocessor 1, during a write cycle following an address cycle, passes the output data via A-D port $P_2$ to the data input of the I/O unit 10. The ground signal applied through connectors 4 and 5 to the control inputs of threestate buffers 2 and 3 forces the buffers 2 and 3 into their "OFF" or nonconductive states so that the interface input and output ports are isolated from the microprocessor A-D ports $P_1$ and $P_2$.

With the circuitry of FIGS. 3 and 4, the program of a single-chip microprocessor utilizing an internal ROM stored program can be changed without replacing an entire printed circuit board. The interface circuitry is manufactured initially with only the circuit of FIG. 3; microprocessor operation is performed in accordance with the program in the internal mask ROM. The program is then changed by connecting the circuit of FIG. 4 via the connectors 4 and 5 to the circuit of FIG. 3. After this change the microprocessor operation is performed in accordance with the program in the ROMs 8 and 9.

In the case of operation with the circuit of FIG. 4 disconnected, the three-state buffers 2 and 3 are conductive and signals pass between the A-D ports $P_1$ and $P_2$ of the microprocessor and the interface input and output ports. Thus all the input/output ports $P_0$, $P_1$, and $P_2$ of the microprocessor 1 are enabled.

In the case of operation with the circuit of FIG. 4 connected, the three-state buffers 2 and 3 are nonconductive, but the interface input and output ports from the buffers 2 and 3 are now accessed by the I/O unit 10. Thus operation of the microprocessor circuit, as seen external to the interface circuit, is not changed.

Figure 5:
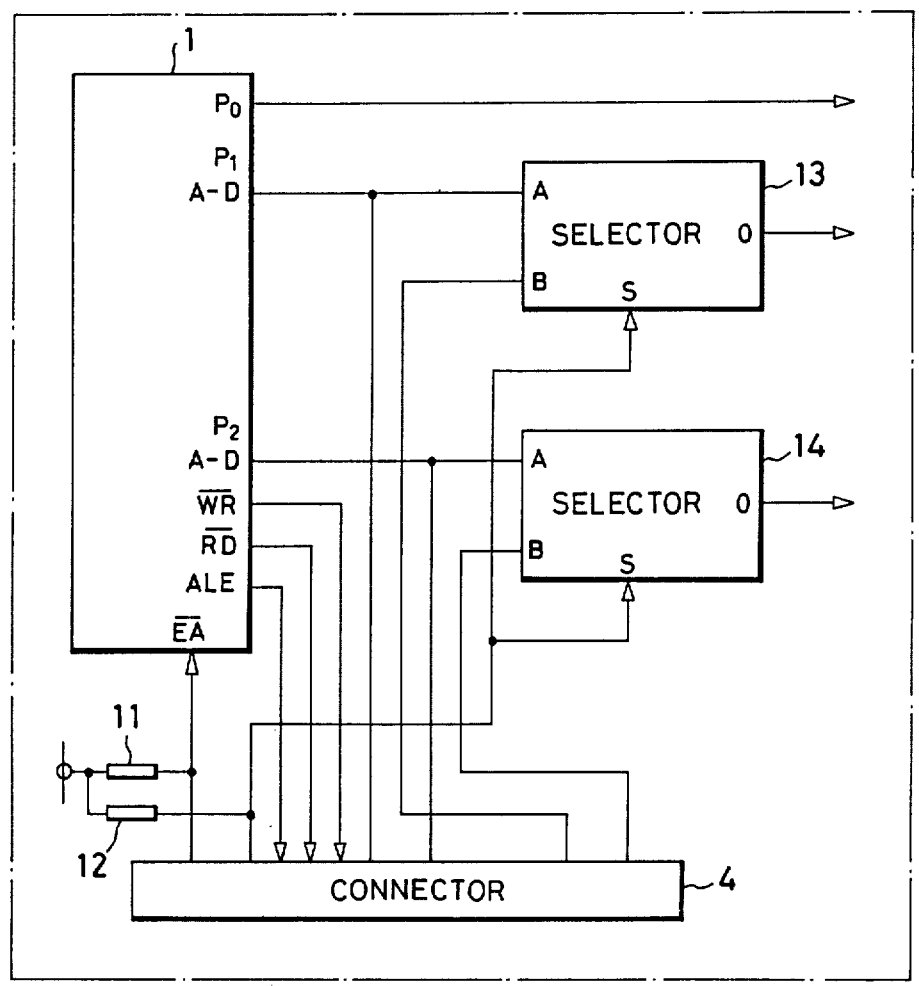
FIG. 5 is a schematic drawing of an interface circuit constructed in accordance with another preferred embodiment of the present invention.

In another embodiment shown in FIG. 5, selectors 13 and 14 replace the three-state buffers of FIG. 3 in the microprocessor interface circuit. The A-D ports $P_1$ and $P_2$ of the microprocessor 1 are connected to inputs A of the respective selectors 13 and 14. When the circuit of FIG. 4 is connected, ports $P_1'$ and $P_2'$ of the I/O unit 10 are connected to the inputs B of the respective selectors 13 and 14. The enable signal, either from resistor 12 or the ground from connector 5, is applied to the select inputs of the selectors 13 and 14. Depending upon whether the circuit of FIG. 4 is connected or not connected, the selectors 13 and 14 connect inputs B or A to the outputs 0 and thus to output ports of the interface circuit.

As described above, the circuits of FIGS. 3 and 5 are constructed such that they may be formed on a base board to include a single-chip microprocessor operated by program instructions stored in its internal memory. The single-chip microprocessor can be changed over to operation by program instructions in external ROMs by connecting the circuit of FIG. 4 via connectors 4 and 5. The present interface circuit provides a highly efficient circuit for a single-chip microprocessor which can be operated by programs stored in either internal or external memory.

I claim:

1. An interface circuit for a microprocessor having internal ROM memory with a first program therein, control input means for selecting operation in first and second modes, said microprocessor in the first mode operating in accordance with the first program in internal memory, said microprocessor in the second mode operating in accordance with a second program in external memory, an address-data port which in the first mode is operable as a data input or output port and in the second mode is operable in a multiplexing mode alternately to output address signals and to input or output program instructions or data from external memory and memory mapped devices, the interface circuit comprising, comprising:

(a) an interface input and/or output port for functioning as the input and/or output port of the microprocessor;

(b) switch means connected between the address-data port of the microprocessor and the interface input and/or output port so as to control conduction or shutting-off of passage of signals between the address-data port of the microprocessor and the interface input and/or output port;

(c) connector means for connecting the address-data port of the microprocessor to external memory means, for connecting said control input means of the microprocessor to external circuitry to operate the microprocessor in the second mode, for connecting external circuitry which operates the switch means to shut-off passage of signals through the switch means, and for connecting an external I/O unit between the address-data port and the interface input and/or output port; and (d) biasing means for operating the switch means to render the switch means conductive in the absence of the connection of the external switch means operating circuitry by the connector means.

2. An interface circuit for a microprocessor as set forth in claim 1 in which said switch means has 3-state buffers wherein the external switch means operating circuitry produces a high impedance condition of the 3-state buffers.

3. An interface circuit for a microprocessor as set forth in claim 1 in which said switch means has selectors for selecting and outputting signals from the address-data ports of the microprocessor in response to the biasing means or signals from the external I/O unit in response to the external switch means operation circuitry.

4. An interface circuit for a microprocessor as set forth in any one of claims 1, 2, or 3 in which said external memory means has memory elements storing the second program therein, and a holding circuit for holding address information to read out the second program stored in said external memory elements.

* * * * *

UNITED STATES PATENT AND TRADEMARK OFFICE
CERTIFICATE OF CORRECTION

PATENT NO. : 4,839,795

DATED : June 13, 1989

INVENTOR(S) : Masahiko Iwasaki

It is certified that error appears in the above-identified patent and that said Letters Patent is hereby corrected as shown below:

On the face of the patent, the inventor's name is incorrect. "Masahiko Iwaksaki" should be --Masahiko Iwasaki--.

Column 5, line 9, delete "comprising," (first occurrence).

Signed and Sealed this

Ninth Day of October, 1990

Attest:

HARRY F. MANBECK, JR.

*Attesting Officer*  *Commissioner of Patents and Trademarks*